(12) United States Patent
Balzer et al.

(10) Patent No.: US 7,991,583 B2
(45) Date of Patent: Aug. 2, 2011

(54) DIAGNOSIS IN AUTOMOTIVE APPLICATIONS

(75) Inventors: Heinrich Balzer, Paderborn (DE); Oliver Niggemann, Detmold (DE); Benno Maria Stein, Paderborn (DE)

(73) Assignee: Dspace Digital Signal Processing and Control Engineering GmbH, Paderborn (DE)

( * ) Notice: Subject to any disclaimer, the term of this patent is extended or adjusted under 35 U.S.C. 154(b) by 268 days.

(21) Appl. No.: 11/734,911

(22) Filed: Apr. 13, 2007

(65) Prior Publication Data

US 2007/0283188 A1 Dec. 6, 2007

(30) Foreign Application Priority Data

Apr. 13, 2006 (DE) .................. 10 2006 017 824

(51) Int. Cl.
*G06F 11/00* (2006.01)
(52) U.S. Cl. ...................................... 702/183
(58) Field of Classification Search .................. 702/183
See application file for complete search history.

(56) References Cited

U.S. PATENT DOCUMENTS

| | | | |
|---|---|---|---|
| 5,023,045 A | 6/1991 | Watanabe et al. | |
| 5,412,584 A | 5/1995 | Umeno et al. | |
| 5,491,631 A * | 2/1996 | Shirane et al. | 701/35 |
| 6,738,697 B2 | 5/2004 | Breed | |
| 2003/0216889 A1 | 11/2003 | Marko et al. | |
| 2004/0199300 A1* | 10/2004 | Gustafsson et al. | 701/1 |

FOREIGN PATENT DOCUMENTS

| | | |
|---|---|---|
| DE | 4340746 | 6/1994 |
| DE | 4340746 C2 | 11/2003 |
| DE | 10320809 | 11/2004 |

OTHER PUBLICATIONS http://www.merriam-webster.com/dictionary/model, p. 1, Feb. 5, 2010.*
http://www.merriam-webster.com/dictionary/simulation, p. 1, Feb. 5, 2010.*
Carl S. Byington, model-based approach to prognostics and health management for flight control actuators, IEEE aerospace conference, Mar. 6-13, 2004, Big Sky, MT, p. 1-12.*
Olaf Moseler and Rolf Isermann, Application of Model-Based Fault Detection to a Brushless DC Motor, IEEE Transactions on Industrial Electronics, vol. 47, No. 5, Oct. 2000, p. 1015-1020.*
Darwiche, "On Compiling System Description it Diagnostic Rules", DX99 Loch Awe, Scotland, Jun. 8-11, 1999, pp. 59-68.
De Kleer, "Diagnosing Multiple Faults", *Artificial Intelligence*, 32(1), 1987, pp. 97-130, Elsevier Science Publishers B.V. (North-Holland).
De Kleer, "Diagnosis with Behavioral Models", in Proceedings of the Eleventh International Joint Conference on Artificial Intelligence, Detroit, Michigan, 1989, pp. 1324-1330.
Greiner, "A correction to the Algorithm in Reiter's Theory of Diagnosis", *Artificial Intelligence*, 41(1), Jul. 1989, pp. 1-5.

(Continued)

*Primary Examiner* — Tung S Lau
(74) *Attorney, Agent, or Firm* — Leydig, Voit & Mayer, Ltd.

(57) ABSTRACT

A system and method for constructing a diagnosis function for mapping a symptom of a fault in an electromechanical system onto the fault by simulating the electromechanical system in at least a fault mode and a node fault mode, and learning a classifier function from the collected simulation results for mapping the system of the fault onto the fault.

12 Claims, 8 Drawing Sheets

OTHER PUBLICATIONS

Reiter, "A Theory of Diagnosis from First Principles", *Artificial Intelligence*, 32(1), 1987, pp. 57-95, Elsevier Science Publications B.V. (North Holland).

Stein, "Model Compilation and Diagnosability of Technical Systems", in Proceedings of the 3rd IASTED Int. Conference on Artifical Intelligence and Applications, (AIA 03), Benalmdena, Spain, Sep. 2003, pp. 191-197.

Steinbauer, "Detecting and locating faults in the control software of autonomous mobile robots" in *IJCAI*, (2005), pp. 1742-1743.

Husemeyer, "Heuristische Diagnose mit Assoziationsregeln", Dissertation, Univerity of Paderborn, Department of Mathematics and Computer Science, 2001, pp. 1-170.

Kalech, "Towards Model-Based Diagnosis of Coordination Failures", in *16th International Workshop on Principles of Diagnosis, DX-05*, (Jun. 2005), pp. 37-42, Monterey, California.

Kimmich, "Fault detection for modern Diesel engines using signal- and process model-based methods", Control Engineering Practice, 13(2), 2005, pp. 189-203, Elsevier Ltd.

Lamperti, "Diagnosis of Active Systems", Chapter 1, pp. 3-20 + cover pp. 1-2, Kluwer Academic Publishers, Hingham, MA, USA, (2003).

Lamperti, "Diagnosis of Active Systems", Chapter 7, pp. 193-227 + cover pp. 1-2, Kluwer Academic Publishers, Hingham, MA, USA, (2003).

Nyberg, "Model-based Diagnosis of an Automotive Engine Using Several Types of Fault Models", pp. 679-689, IEEE Transaction on Control Systems Technology, vol. 10, No. 5, Sep. 2002.

Roos, "A Protocol for Multi-Agent Diagnosis with Spatially Distributed Knowledge", pp. 655-661, in *Autonomus Agents and Multi Agent Systems, AAMAS-2003*, (Jul. 2003), Melbourne, Australia.

Sanseverino, "Model-Based Diagnosis for Automotive Repair", pp. 33-37, IEEE Expert, vol. 12, No. 6, (1997).

Struss, "Model-based Systems in the Automotive Industry", pp. 17-34, *American Association for Artificial Intelligence* A1 Magazine, 24, 2003.

P.-N. Tan at al, "Introduction to Data Mining", Person, Addison Wesley, ISBN: 0-321-32136-7, pp. 146-172, 2006.

Console, "Model-Based Diagnosis Meets Error Diagnosis in Logic Programs", in IJCAI, pp. 1494-1499, Chambery, France, 1993.

Grosclaude, "Model-based monitoring of component-based software systems", in 15th International Workshop on Principles of Diagnosis, DX-04, Carcassonne, France, 2004, pp. 155-160.

Koeb, "Abstract Model Refinement for Model-Based Program Debugging", pp. 1-6, 2005.

Abdelwahed, "A consistency-based Robust Diagnosis Approach for Temporal Causal Systems", in 16th International Workshop on Prinziples of Diagnosis, DX-05, Monterey, California, 2005, pp. 1-7.

Mayer, "Approximate Modeling for Debugging of Program Loops", in 15th Intenrnational Workshop on Principles of Diagnosis, DX-04, pp. 87-92, 2004, Carcassonne, France.

Mikaelian, "Diagnosing Complex Systems with Software-Extended Behavior using Constraint Optimization", in 16th International Workshop on Principles of Diagnosis, DX-05, 2005, pp. 19-24, Monterey, California.

Struss, "Model-Based Diagnosis—Progress and Problems" in Proceedings of the International GI-Convention, vol. 3, 1989, pp. 320-331.

Struss, ""Physical Negation"—Integrating Fault Models in to the General Diagnostic Engine", in Proceedings of the Fifteenth International Joint Conference on Aritifical Intelligence, (IJCAI 89), vol. 2, 1989, pp. 1318-1323.

Cascio, "On-board diagnosis of automotive systems: from dynamic qualitative diagnosis to decision trees", 1999, pp. 1-14.

Fritz, "Fault detection in an electromechanical wheel brake actuator by model-based methods", 2002, pp. 1-10 [English abstract on p. 1].

Kurien, "Distributed Diagnosis of Networked, Embedded Systems", in 13th International Workshop on Priniples of Diagnosis, DX-02, 2002, pp. 179-188, Semmering, Austria.

Roychoudhury, "Designing Distributed Diagnosers for Complex Physical Systems", pp. 31-36, in 16th International Workshop on Principles of Diagnosis, DX-05, 2005, Monterey, California.

Seibold, "Sichere Fehlerdiagnose in der Automobilwartung mit RODON 3", pp. 70-75, Automotive Electronics, 2004 [English translation of "Einleitung" (Introduction) on the last page of document].

Stein, "Model Construction in Analysis and Synthesis Tasks", pp. 1-265, Habilitation Thesis, Department of Computer Science, University of Paderborn, Germany, 2001.

Su, Wonham, "Distributed Diagnosis for Qualitative Systems", in Proceedings of the 6th International Workshop on Discrete Event Systems, WO DES-02, pp. 169-174, Zaragoza, Spain, 2002.

Niggemann, "Visual Data Mining of Graph-Based Data", Dissertation from the Department of Mathematics and Computer Science of the University of Paderborn, Germany, pp. 1-150, 2006.

* cited by examiner

DIAGNOSIS IN AUTOMOTIVE APPLICATIONS

CROSS REFERENCE TO RELATED APPLICATIONS

This application claims priority to German Patent Application Serial No. 10 2006 017 824.6, filed Apr. 13, 2006, which is hereby incorporated by reference as if set forth in its entirety.

The present invention relates to a diagnosis system for automotive systems, more specifically, a system model for diagnosing automotive system faults.

BACKGROUND

Today's cars are complex electromechanical systems. Despite their ever increasing technological complexity, there is much desire in improving the reliability of the electromechanical system. Consequently, the diagnosis process itself can become highly involved. For example, hardware systems and software systems together form a complex setup. In addition, data from various sensors is used by a complex network of distributed and inter-dependent software modules-modules that are specified at different phases in the development process and that are developed by different companies.

Classification of Fault Types

Figure 1:
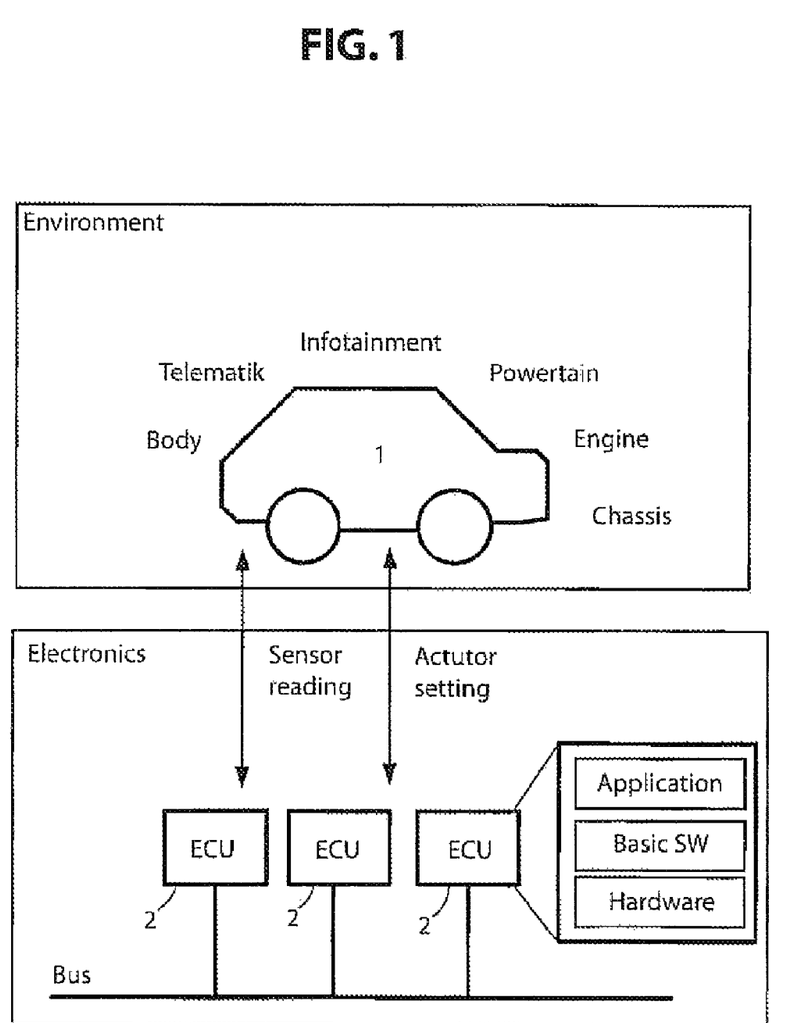
FIG. 1 illustrates an embodiment of the present invention in a vehicle environment.

Errors and faults might occur at different places within a vehicle. As shown in FIG. 1, the system "vehicle" can be divided into two subsystems: the electronics and the environment. The electronics comprises the electronic control units (ECUs), the buses connecting ECUs, and the sensors and actuators which act as the ECU's interface to the environment. In today's cars up to seventy ECUs are connected to mechanical devices as well as to other ECUs and perform dedicated control tasks.

The main purpose of ECUs is to control parts of the environment, e.g., the engine or the gear. For this, ECUs execute application software modules. In addition to these software module applications, ECUs also contain basic software that is needed to execute applications and to connect them to sensors, actuators, and buses. The basic software comprises modules such as an operating system, I/O drivers, communication stack, and ECU services. Normally, the power supply is also included in the electronics subsystem.

Figure 2:
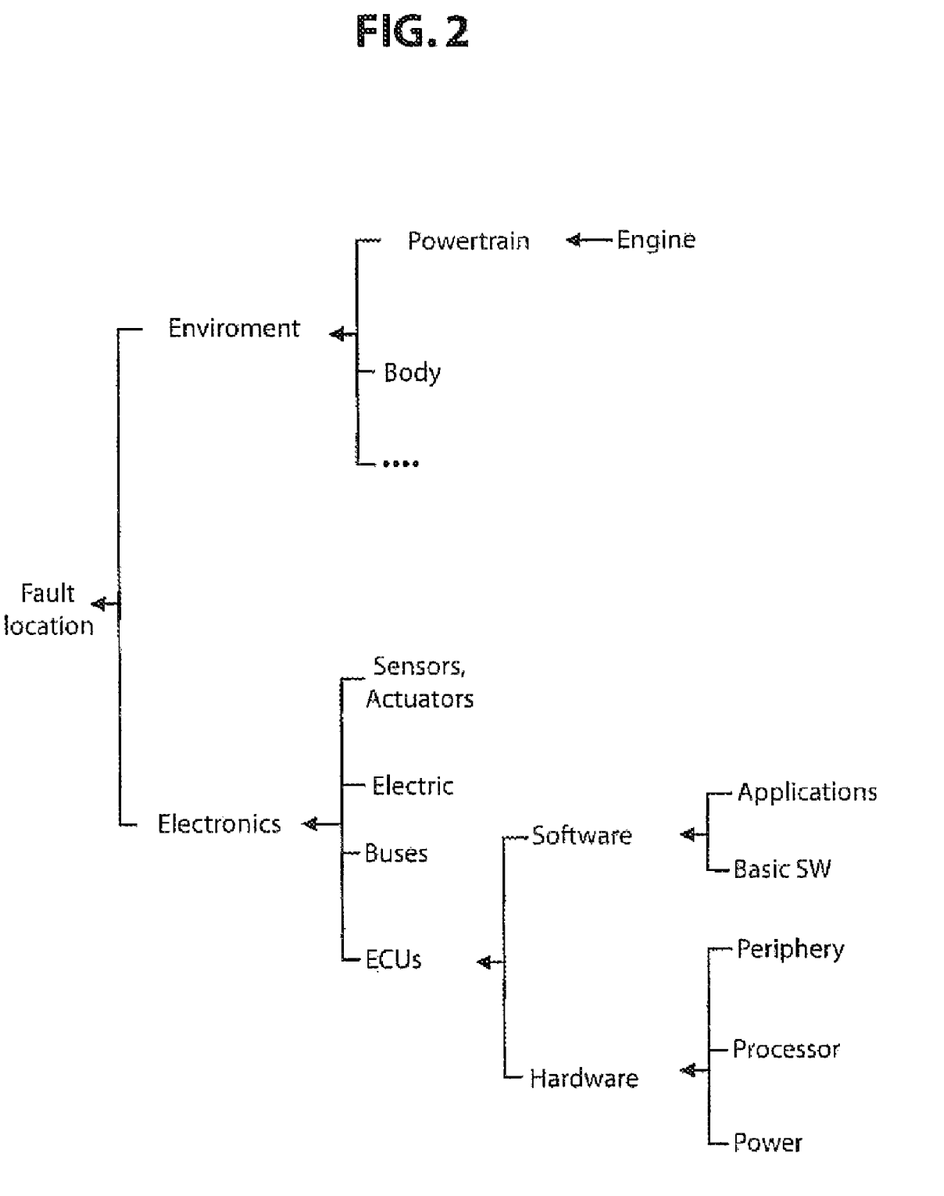
FIG. 2 illustrates a taxonomy of fault locations.

The environment comprises the rest of the vehicle and includes the driver, the road, the weather, and the following vehicle domains:

Powertrain Examples: engine, gear, drive shaft
Chassis Examples: brakes, damping, steering
Body Examples: light, wipers, climate control, key-less entry
Safety Examples: airbag, active safety belts
Telematics/Infotainment Examples: radio, navigation, telephone FIG. 2 illustrates a sample taxonomy of fault locations. As mentioned previously, a vehicle can be subdivided into two main subsystems—the environment and the electronics. Within the environment subtree, the vehicle domains mentioned are differentiated as discussed above. In the electronics subtree, faults can occur in (i) ECUs, (ii) in connection with buses, (iii) in the context of the power supply, or (iv) in sensors, actuators, or their wiring. Note that within ECUs, both hardware and software can fail. The latter is often differentiated with respect to errors in application software or in basic software.

Diagnosis Based on Symptom Detection

The purpose of diagnosis systems within a vehicle is to identify faults and to initiate appropriate countermeasures. Fault identification suffers from one inherent problem: Faults can not be observed directly, and only the effects caused by the fault can be detected by the vehicle's electronics. For example, a fault in the engine may lead to unusual readings for sensors such as engine temperature or revolution (RPM).

In general, a diagnosis can be seen as a three step procedure:

1. Identification of unusual vehicle conditions. Such conditions are identified by comparing an expected vehicle behavior with the observed behavior—e.g. observed by means of sensor reading. Detected discrepancies are called symptoms.
2. Deduction of Faults. Based on the symptoms, the underlying faults are deduced.
3. Finally, countermeasures such as a warning to the driver are initiated by the diagnosis system.

Figure 3:
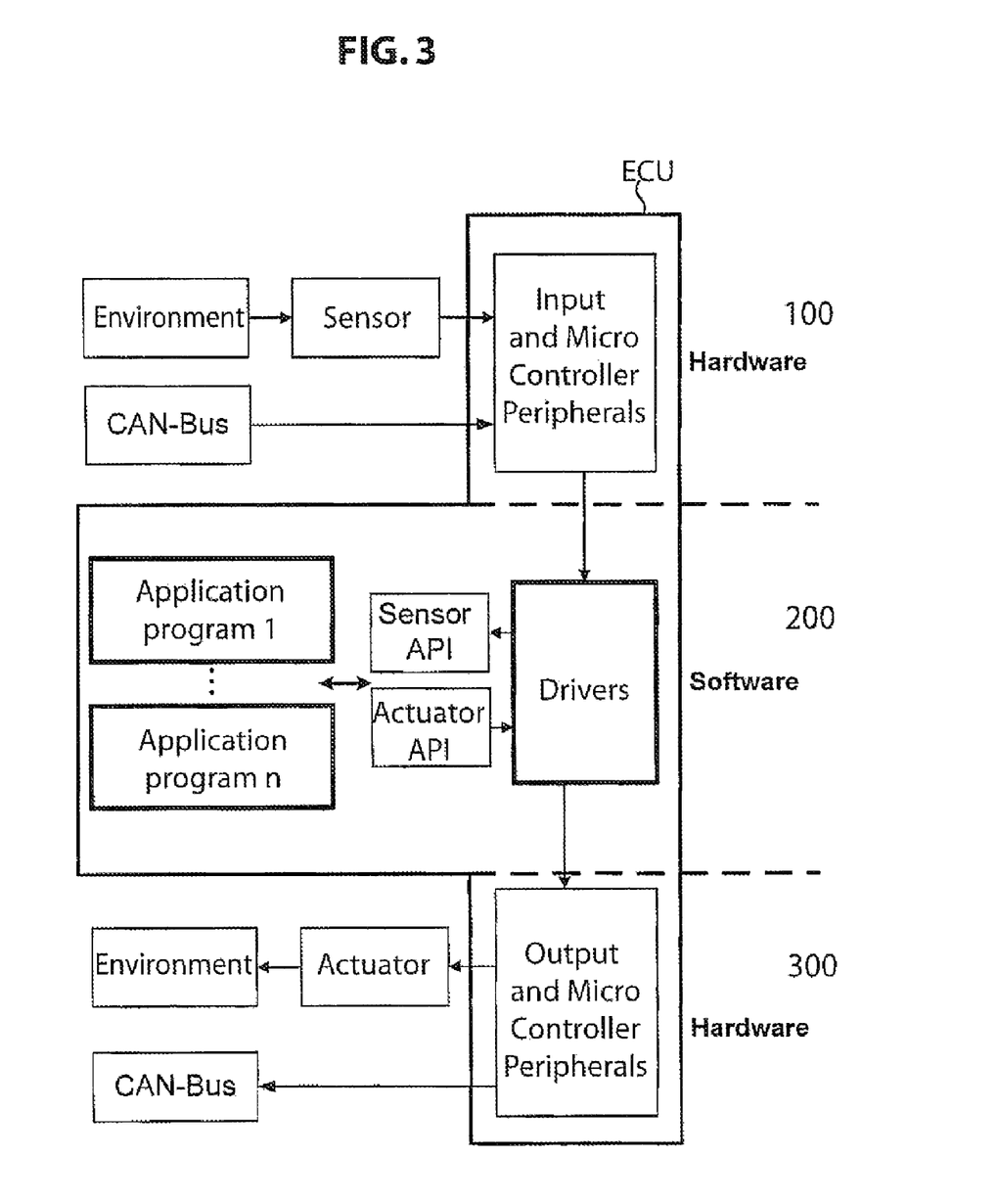
FIG. 3 illustrates a simplified ECU structure from a software point-of-view.

Symptoms are detected in the software modules on the ECUs. FIG. 3 shows a simplified ECU structure from a software point-of-view. As illustrated in FIG. 3, an ECU is organized as different hardware and software layers. Faults may occur in each layer but do not become observable until the driver layer or the application layer.

Sensor readings or bus signals are read by application software modules via different hardware layers 100 and software layers 200 and are written to actuators or buses on hardware layer 300. In traditional diagnosis systems, symptom detection may only be implemented by drivers/basic software and by application software modules, i.e., all symptoms from all fault locations are detected by these software modules, rendering the process of differentiating between different faults a very difficult task.

Symptoms can be classified into two coarse categories, local and remote. Local symptoms occur directly at the fault's location. An example would be a short circuit of a cable attached to an ECU. Faults causing such kinds of local symptoms can be identified rather easily. In the example illustrated in FIG. 3, the corresponding I/O driver could detect the wrong voltage level.

Remote symptoms occur dislodged from the fault location. Examples of remote symptoms include (i) faults in the environment, e.g., engine problems or (ii) bus errors that influence all connected ECUs. Obviously, the detection of faults causing such symptoms is significantly more challenging.

Remote symptoms have occurred much more often in the last few years, leading to more and more difficult diagnosis scenarios. This is mainly due to the development towards more complex applications, i.e., towards large and distributed software systems. Examples of these systems include driver assistant functions such as active cruise control (ACC), active front steering (AFS), or the lane keeping support. These systems are distributed over several ECUs and often rely on other, already existing software modules. Faults occurring at one module of such a distributed software system may trigger further faults within other connected software modules. This leads to the detection of a large number of symptoms on several ECUs.

The diagnosis of technical systems is a research field that is largely governed by modeling questions:

Which modeling strategy is adequate, a deep behavior model or a shallow rule model?
Is a distinction between a correct behavior model and a fault model necessary?
Is the diagnosis process controlled by heuristic expert knowledge, and, if so, how shall it be represented?

How can diagnosis knowledge be maintained or kept up-to-date?

Is a modeling open to integrate knowledge of unforeseen faults?

Traditional approaches predominantly use model-based diagnosis. The basic idea is to have a system simulation running in parallel to the real system and to use the simulation results to detect symptoms, i.e., discrepancies between the expected and observed behavior. This is referred to as a behavior model M.

In theory, possible faults causing symptoms can be deduced by analyzing a behavior model in reverse direction, from symptoms to faults. In practice, however, such an inverse simulation of M usually leads to a very complex analysis problem that is generally not traceable. Hence, often a specialized diagnosis model, $M_D$, is constructed by domain experts, where fault deduction is treated in a forward reasoning manner.

Model-based approaches may employ different algorithms, as described in Raymond Reiter, 'A Theory of Diagnosis from First Principles', *Artificial Intelligence*, 32(1), 57-95, (1987) or Johan de Kleer and Brian C. Williams, 'Diagnosing Multiple Faults', *Artificial Intelligence*, 32(1), 97-130, (1987), which is hereby incorporated by reference as if set forth in its entirety. One approach for detecting failures during operation is described in Gerald Steinbauer and Franz Wotawa, "Detecting and locating faults in the control software of autonomous mobile robots" in *IJCAI*, pp. 1742-1743, (2005), which is hereby incorporated by reference as if set forth in its entirety. In these traditional systems, control software of autonomous robots is monitored with observers, which are a certain form of a behavior model running in parallel in order to detect symptoms. To find the faults, model-based diagnosis is applied. Here, the system's behavior, i.e., $M_D$, is modeled using propositional logic. Reiter's hitting set algorithm, as discussed in Reiter and Russell Greiner, Barbara A. Smith, and Ralph W. Wilkerson, 'A Correction to the Algorithm in Reiter's Theory of Diagnosis', *Artificial Intelligence*, 41(1), 79-88, (1989), hereby incorporated by reference as if set forth in its entirety, is used together with a propositional Horn clause theorem prover. After the fault detection, an algorithm is executed which repairs the software.

In Sherif Abdelwahed, Gabor Karsai, and Gautam Biswas, 'A Consistency-based Robust Diagnosis Approach for Temporal Causal Systems', in *16th International Workshop on Principles of Diagnosis, DX*-05, pp. 73-79, Monterey, Calif., USA, (June 2005), hereby incorporated by reference as if set forth in its entirety, a simple so-called "timed failure propagation graph" is introduced. This graph is used as M and indicates the way a failure propagates through the system. Additionally, the time range is known for the failure propagation between system components. Because of discrepancies between the expected behavior of a signal and the observed behavior, the faults detection is started. For this, the same graph is used, i.e. here $M=M_D$.

In Tsoline Mikaelian, Brian C. Williams, and Martin Sachenbacher's 'Diagnosing Complex Systems with Software-Extended Behavior using Constraint Optimization', in *16th International Workshop on Principles of Diagnosis, DX*-05, pp. 19-24, Monterey, Calif., USA, (June 2005), hereby incorporated by reference as if set forth in its entirety, systems comprising hardware and software are diagnosed. For this, a probabilistic, hierarchical, constraint-based automata is used as M and $M_D$. The diagnosis task is formulated as a constraint optimization problem (COP) and solved with optimization techniques.

In Luca Console, Gerhard Friedrich, and Daniele Theseider Dupre's 'Model-Based Diagnosis Meets Error Diagnosis in Logic Programs', in *IJCAI*, pp. 1494-1501, Chambery, France, (1993), it was shown that model-based diagnosis can be applied to program debugging. As a result, many researchers started to work in this area, for example, as disused in Daniel Köb, Rong Chen, and Franz Wotawa, 'Abstract model refinement for model-based program debugging', in *16th International Workshop on Principles of Diagnosis, DX*-05, pp. 7-12, Monterey, Calif., USA, (June 2005) ("Köb et al."); Irene Grosclaude, 'Model-based monitoring of component-based software systems', in *15th International Workshop on Principles of Diagnosis, DX*-04, Carcassonne, France, (June 2004); and Wolfgang Mayer and Markus Stumptner, 'Approximate Modeling for Debugging of Program Loops', in *15th International Workshop on Principles of Diagnosis, DX*-04, pp. 87-92, Carcassonne, France, (June 2004). In Köb et al. a technique similar to constraint propagation is used in combination with model checking. This technique depends on a model $M=M_D$ that is based on the source code. Component-based software is monitored in Grosclaude whereas the behavior of the software components is modeled by Petri nets, i.e., here $M=M_D$. Symptoms are detected online. Each of these references is hereby incorporated by reference as if set forth in its entirety.

Furthermore, there exist approaches for detecting failures using distributed systems or multi-agent systems, as discussed in Indranil Roychoudhury, Gautam Biswas, Xenofon Koutsoukos, and Sherif Abdelwahed, 'Designing Distributed Diagnosers for Complex Physical Systems', in *16th International Workshop on Principles of Diagnosis, DX*-05, pp. 31-36, Monterey, Calif., USA, (June 2005); James Kurien, Xenofon Koutsoukos, and Feng Zhao, 'Disributed Diagnosis of Networked, Embedded Systems', in *13th International Workshop on Principles of Diagnosis, DX*-02, pp. 179-188, Semmering, Austria, (May 2002); R. Su, W. Wonham, J. Kurien, and X. Koutsoukos, 'Distributed Diagnosis for qualitative Systems', in *Proceedings of the 6th International Workshop on Discrete Event Systems*, WODES-02), eds., M. Silva, A. Giua, and J. M. Colom, pp. 169-174, Zaragoza, Spain, (October 2002); Nico Roos, Annette ten Teije, and Cees Witteveen, 'A Protocol for Multi-Agent Diagnosis with spatially distributed Knowledge', in *Autonomous Agents and Multi Agent Systems*, AAMAS-2003, pp. 655-661, (July 2003); Gianfranco Lamperti and Marina Zanella, *Diagnosis of Active Systems*, Kluwer Academic Publishers, Hingham, Mass., USA, 2003; and Meir Kalech and Gal A. Kaminka, 'Towards Model-Based Diagnosis of Coordination Failures', in *16th International Workshop on Principles of Diagnosis, DX*-05, pp. 37-42, Monterey, Calif., USA, (June 2005). Each of these references is hereby incorporated by reference as if set forth in its entirety.

Diagnosis in Automotive Applications

In the automotive industry model-based approaches have also been used frequently. A main distinguishing feature is whether they are used onboard to diagnose failures during a vehicle's operation or if they are used offboard, e.g., in a garage. Legal requirements concerning gas emission and safety regulations, such as for driver assistant applications, demand more complex diagnosis systems for onboard diagnosis.

In Mattias Nyberg, 'Model-based diagnosis of an automotive engine using several types of fault models', *IEEE Transaction on Control Systems Technology*, 10(5), 679-689, (September 2002), which is hereby incorporated by reference as if set forth in its entirety, a no-fault-model $M_1=M_{D1}$ and various fault models $M_2=M_{D2}$ to $M_k=M_{Dk}$ are constructed to diagnose sensor faults and leakages of the air-intake system of an engine. In the corresponding diagnosis system a framework of structured hypothesis tests is used to be able to decide which of the models can explain the measured data.

For many model-based approaches, qualitative models are used such as in Peter Struss and Chris Price, 'Model-based systems in the automotive industry', *AI Magazine,* 24(4), 17-34, (2004), hereby incorporated by reference as if set forth in its entirety, where consistency-based diagnosis is used for onboard diagnosis. In these approaches, there is used one model $M=M_D$. Qualitative models, or more precisely qualitative deviation models, here M, for onboard diagnosis are also used in F. Cascio, L. Console, M. Guagliumi, M. Osella, A. Panati, S. Sottano and D. Dupre. On-board diagnosis of automotive systems: from dynamic qualitative diagnosis to decision trees, 1999, hereby incorporated by reference as if set forth in its entirety, where diagnostic situations are simulated. The outcome of the simulation is exploited to learn a decision tree for the diagnostic system. Some other model-based approaches are given in M. Sanseverino, F. Cascio, "Model-Based Diagnosis for Automotive Repair", IEEE Expert, Vol. 12, No. 6, pp. 33-37 (1997); M. Fritz, A. Albers, "Fault detection in an electromechanical wheel brake actuator by model-based methods", 2002; Werner Seibold and Bernhard Höfig, 'Secure Diagnosis in the automotive maintenance with RODON 3, Vieweg, 2004; and in Frank Kimmich, Anselm Schwarte, and Rolf Isermann, 'Fault detection for modern Diesel engines using signal- and process model-based methods', *Control Engineering Practice,* 13(2), 189-203, (2005). Each of these references is hereby incorporated by reference as if set forth in its entirety.

The approach set forth in the present invention is based on the model compilation approach introduced in Benno Stein, *Model Construction in Analysis and Synthesis Tasks*, Habilitation, Department of Computer Science, University of Paderborn, Germany, June 2001, and in Uwe Husemeyer, *Heuristic diagnosis with compound rules*, Dissertation, University of Paderborn, Department of Mathematics and Computer Science, 2001. Each of these references is hereby incorporated by reference as if set forth in its entirety.

SUMMARY

The present invention provides a system and method for constructing a diagnosis function for mapping a symptom of a fault in an electromechanical system onto the fault by simulating the electromechanical system in at least a fault mode and a node fault mode, and learning a classifier function from the collected simulation results for mapping the system of the fault onto the fault.

BRIEF DESCRIPTION OF THE DRAWINGS

Exemplary embodiments of the present invention are explained in more detail below with reference to the accompanying drawings, in which.

DETAILED DESCRIPTION

The present invention introduces a new technology to the diagnosis of automotive systems as both a formal framework and a concrete implementation, comprising an experimental setup, simulation tasks, and classification results.

The present invention is directed to intricate diagnosis situations in modern cars. The invention employs a mixture of model-based and associative diagnosis and an associated model compilation. In the present invention, a simulation database is built from module simulations of the system in various fault modes over a typical input range. From the simulation database, a simplified rule-based behavior model can be constructed where long cause-effect chains are replaced with much simpler associations. The behavior model is also optimized for a heuristic classification of the faults. The present invention applies the novel model behavior to the complex discrete event/continuous system models of modern cars.

Model compilation is a diagnosis approach that combines the model-based paradigm and the associative (heuristic) paradigm within the following four steps:

1. Simulation. A database, C, is compiled by simulating the interesting system in various fault modes and over its typical input range.

2. Symptom Computation. By comparing the faultless simulation to simulation runs in fault modes a symptom database $C_A$ is built up.

3. Generalization. Using cluster analysis or vector quantization, the numerical values in $C_A$ are abstracted towards intervals.

4. Learning. Data mining and machine learning is applied to learn a mapping from symptoms onto the set of fault modes; the resulting classifier can be considered as a "diagnosis compiled model."

Since this process can be completely automated, the approach has the potential to combine the advantages of the model-based philosophy, such as behavior fidelity and generality, with the efficiency and robustness of a heuristic diagnosis system.

One advantage of the present invention is that the substantial number of existing libraries of behavior models, along with the expertise to handle them, can be reused in the simulation step. Additionally, the behavior models are analyzed in their intended inference direction, i.e., neither a special diagnosis model needs to be developed nor an inverse simulation problem needs to be solved.

Further, the classifier learned in the generalization and learning steps integrates seamlessly with existing diagnosis approaches in the automotive domain, such as fault trees. Another advantage provided by the present invention is that the compiled diagnosis model has a very small computational footprint. In contrast, traditional diagnosis approaches require the execution and analysis of a behavior model at runtime.

As illustrated in FIG. 1, a car 1 is complex system that consists of several connected (sub)systems, such as motor, drive train, motor control, etc. For simulation purposes we consider each interesting subsystem being adequately represented as a behavior model M. Depending on the associated subsystem and the simulation purpose, M may be input-free or input-depending; or memoryless or dynamic. The most important distinction relates to the time base of dynamic models, that being continuous time, discrete time, or discrete event.

Definition 1 (Behavior Model): A behavior model M is a tuple $(F_U, F_Z, F_Y, V, \Delta, \Lambda)$. $F_U \cap F_Z = \emptyset$, whose elements are defined as follows.

$F_U$, $F_Z$, and $F_Y$ are sets of input variables, constraint variables, and output variables.

For each variable $v \in F_U, F_Z, F_Y$ there is an arbitrary, possibly infinite set $U_v, Z_v$, and $Y_v$ respectively, called the domain of v.

For each $v \in F_U$ there is an additional domain, $U_v^T$, of partially defined functions in the parameter time, $U_v^T :=\{u|u: T \to U_v, t \mapsto u(t)\}$. Depending on the model's time base, which may be continuous time, discrete time, or discrete even, T may be an interval from $R^+$, an interval from N, or a linearly ordered finite set.

V comprises the domains of all variables. As a matter of convenience, the Cartesian products of the domains of the variables in $F_U, F_Z, F_Y$ are designated with U, $U^T$, Z, and Y. E.g., $Y := Y_{v1} \times Y_{v2} \times \ldots \times Y_{v|Y_Y|}$, $v_i \in F_Y$.

$\Delta$ is a function, it is called the global state prescription function. $\Delta$ declares a set of state variables, $F_x \subset F_z$, and a state space, X, which is the projection of Z with respect to $F_X$. Given a state vector $x \in X$, a vector of input functions $u(t) \in U^T$, and some point in time $t \in T$, $\Delta$ determines a constraint vector $z \in Z$ including a new state, say, $\Delta$: $X \times U^t \times T \to Z$.

$\Lambda$ is a function, it is called the output function. The output function might be a function of constraint variables and input or only a function of constraint variables. Given a constraint vector $z \in Z$ and an input vector $u \in U$, $\Lambda$ determines an output vector $y \in Y$, say, $\Lambda: Z \times U \to Y$ or $\Lambda: Z \to Y$.

A model of even a small part of a car is likely to combine behavior models of different types, say, different time bases; such a model is called "hybrid."

Let $M = \{M_1, \ldots, M_k\}$ be a possibly hybrid car model, then $M_i$ and $M_j$ are coupled if they share output variables and input variables, i.e., if $F_{Yi} \cap F_{Uj} \neq \emptyset$, with $F_{Yi} \in M_i$, $F_{Uj} \in M_j$, $i \neq j$. For example, $M_i$ may be a continuous time model of the motor, and $M_j$ may be a discrete time model of the motor control. In the car such a coupling is realized by a sensor whose signal is passed to an ECU where, in the software abstraction layer, the physical quantity is represented as an input variable of the motor control software.

The preceding definition can be regarded as a correct behavior model specification of a system. For the diagnosis approach of the present invention, we also need models of fault behavior in the sense of the GDE+, as described in Peter Struß, 'Model-Based Diagnosis—Progress and Problems', in *Proceedings of the International GI-Convention*, volume 3, pp. 320-331, (October 1989); Peter Struß and Oskar Dressler, '"Physical Negation"—Integrating Fault Models into the General Diagnostic Engine', in *Proceedings of the Fifteenth International Joint Conference on Artificial Intelligence (IJCAI 89)*, volume 2, pp. 1318-1323, (1989); and Johan deKleer and Brian C. Williams, 'Diagnosis with Behavioral Models', in *Proceedings of the Eleventh International Joint Conference on Artificial Intelligence (IJCAI 89)*, pp. 1324-1330, Detroit, Mich., (1989). Each of these references is hereby incorporated by reference as if set forth in its entirety.

A fault behavior model is an extension of the above definition: There is an additional set of state variables, $F_D$, along with respective domains D, and a state prescription function $\Delta'$. $F_D$ defines fault states of the components, such as those discussed previously or illustrated in FIG. 2. Thus, the domain of $\Delta'$ is $D \times X \times U^T \times T$.

Let $\sigma(M, u(t))$ and $\sigma(M'_i, u(t))$ designate simulation results of the faultless model M and some fault model $M'_i$ for a given vector of input functions $u(t)$. By applying a model- and quantity-specific "difference" operator, $\ominus$, between the simulated O.K.-values and the related fault values a database $C_\Delta$ with symptom vectors can be compiled:

$$\sigma(M, u(t)) \ominus \sigma(M'_i, u(t)) = C_\Delta, i=1, \ldots, k \quad (1)$$

In a second step, based on filtering, machine learning, and data mining methods, a classifier can be constructed that maps from symptoms onto faults:

$$C_\Delta \to F_D \quad (2)$$

An alternative to the previous steps is the direct application of a learning approach to the simulation results:

$$C \to F_D \text{ with} \quad (3)$$

$$C = (\sigma(M, u(t)) \cup \sigma(M'_i, u(t)), i=1, \ldots, k$$

Note that this alternative burdens the learning approach with the task of both discovering and implicitly computing the $\ominus$-operation, and hence it is less powerful. On the other hand, it enables one to directly apply the learned diagnosis associations at runtime without the need of simulating M and applying the $\ominus$-operator.

Case Study

To obtain first experimental results, a case study has been made by the inventors:

In this case study, faulty sensor readings within an engine ECU are diagnosed.

Figure 4:
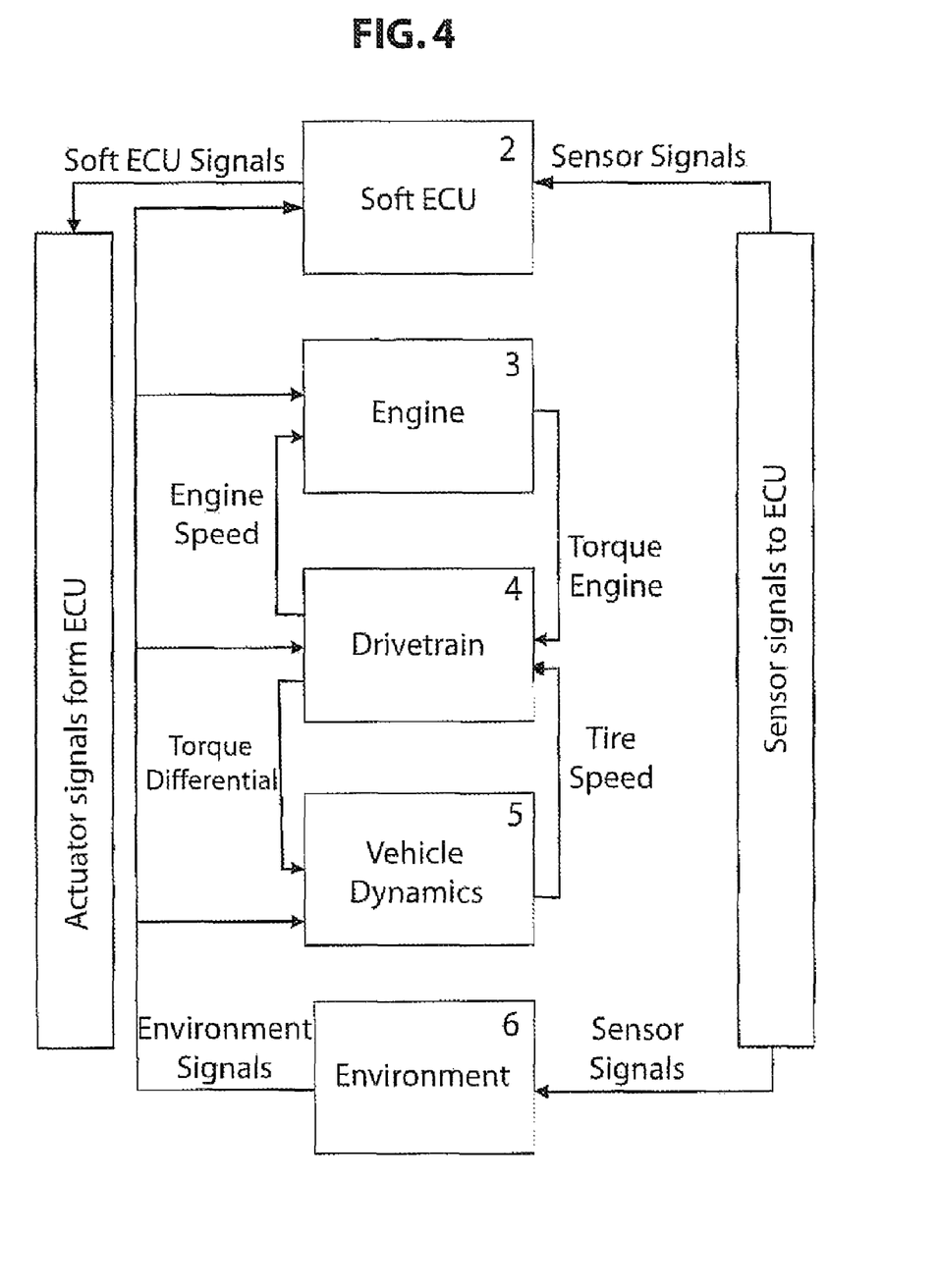
FIG. 4 illustrates an overview of a model according to the present invention.

To simulate the behavior of the engine and its ECU, advanced models are needed that are able to represent the correct physical behavior of an engine. Furthermore, since the engine and its ECU 2 do not operate autonomous in a car 1 but interact with other components and ECUs 2, additional models such as drivetrain models are needed. Here, the "Gasoline Engine Simulation Package" of dSPACE's Automotive Simulation Models (ASM) has been used, which is implemented in Matlab/Simulink. The model is a complete model of a six-cylinder 2.9 L gasoline engine and comprises also models for the engine 3, ECU 2, drivetrain 4, vehicle dynamics 5, and environment 6. In the vehicle dynamics model there are external forces on the vehicle taken into account, such as air resistance and braking. In the environment model road conditions and the drivers interactions are considered. An overview of the model components: ECU 2, the engine 3, the drivetrain 4, the vehicle dynamics 5, and the environment 6 can be seen in FIG. 4.

Figure 5:
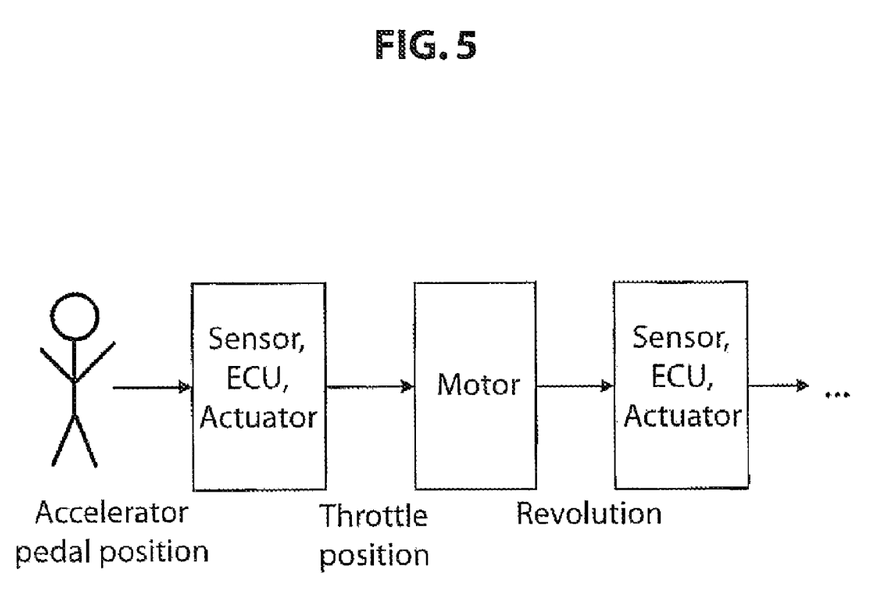
FIG. 5 illustrates a signal flow in the present invention.

The model compilation approach is described using the example of a faulty accelerator pedal position reading. In the engine model exists an accelerator pedal sensor that relays the signal to the ECU. In the ECU the data is used to set actuators such as the throttle position in the motor. This signal flow can be seen in FIG. 5. The starting point of the signal flow is the user input for the accelerator pedal.

Model Description

To simplify matters, the models for drivetrain 4, vehicle dynamics 5, and environment 6 are not shown since are not necessary for describing the different faults. The present description focuses on the engine model, denoted as $M_1$, and the model for the engine ECU, denoted as $M_2$. A third model $M_3$ comprises the sensor and actuator software and hardware. In this model faults may be generated.

Figure 6:
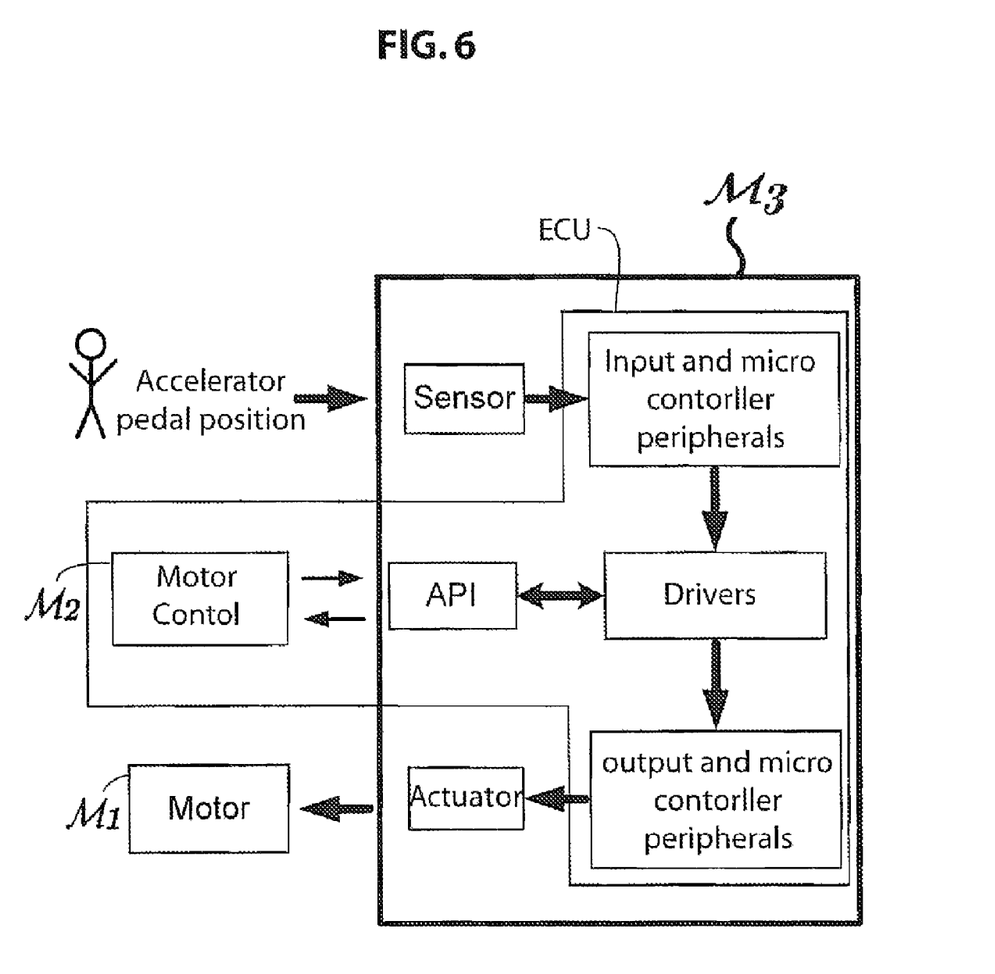
FIG. 6 illustrates the interplay between a motor, motor control, and connecting subsystems between user input, motor, and motor control.

FIG. 6 illustrates the interplay of three models: $M_1$ (motor), $M_2$ (motor control), and $M_3$ (connecting subsystems between user input, motor, and motor control). In the faultless behavior situation $M_3$ functions as a short-circuit, directly connecting both the user input with $M_2$ and $M_1$ with $M_2$; in a fault situation the model $M_3$ acts as a fault model and inserts particular signal disturbances.

As long as no faults exist, $M_3$ does nothing but relaying signals between $M_2$ and $M_1$. But if faults should be simulated, $M_3$ is used to manipulate (i) the sensor data so that the motor control receives disturbed values or (ii) the actuator data so that the motor receives disturbed values. Using this, we can simulate both the faultless behavior and the fault behavior. That is why in this case a fault behavior model M' is not used. Additionally, further implementations failures could also be generated in the other parts of $M_3$, e.g., in the drivers or in the API.

In the following definition 1 is used to describe the example formally:

$$F_{Y_{M_1}}$$

comprises values such as mean effective engine torque.

$$F_{U_{M_1}}$$

consists of variables such as crank angle per cylinder and throttle angle. Note that $$F_{U_{M_1}} = F_{Y_{M_2}}.$$

Examples for input variables of $$F_{U_{M_2}}$$

are accelerator pedal position, ignition signal, and engine speed.

$$F_{U_{M_3}} \text{ and } F_{Y_{M_3}}$$

do not comprise any variable that are not used in $M_1$ and $M_2$. Thus, $$F_{U_{M_3}} = F_{U_{M_2}} \cup F_{U_{M_1}} = F_{Y_{M_3}}.$$

This is because $M_3$ is only used to manipulate input and output variables of the engine control.

$$F_{X_{M_2}}$$

might comprise, for example, the throttle position.

$$F_{X_{M_1}}$$

consists of such variables as the manifold temperature, the air flow through the throttle, and several others.

In $M_3$ the state variables $$F_{X_{M_3}}$$

are constants which control the fault types.

$\Delta_{M_1}$ and $\Delta_{M_2}$ are one or more differential equations describing the real behavior of the corresponding components to compute the constraint variables and the output variables. If no faults are simulated, $M_3$ comprises no differential equations, so $\Delta_{M_3}$ is, in that case, an identity function and just passes the input values. In the case of a fault, $\Delta_{M_3}$ manipulates one or more input values by multiplying a given value with the input value or by adding an offset to the input value. For example, a random value might be added to the accelerator pedal signal to simulate white noise.

In this case $\Lambda$ only maps the values from Z to Y. So $\Lambda_{M_1}$, $\Lambda_{M_2}$, and $\Lambda_{M_3}$ are the identity function.

Considered Fault Types

For this first case study, some basic faults occurring in sensors and actuators were implemented. This is a realistic fault type in modern cars. In this case study, four different fault types were modeled:
1. The signal is reduced to 90% of its correct value.
2. The signal value used for the simulation is 110% of the correct value.
3. Noise is added to the signal.
4. The signal is dropped out.

Simulation of the Overall Model

The overall model comprises the models described above and the models for the drivetrain 4, the vehicle dynamics 5, and the environment 6. The main input variables of this model are driver actions as observed by the respective sensors. Here, the driver is a subsystem of the environment model. So the set of input variables comprises among other things the positions of the brake pedal, the clutch pedal, the accelerator pedal, and the engaged gear.

For simulation purposes j different vectors of input function $u_1(t), \ldots, u_j(t) \in U^T$ were defined. These vectors are called scenarios and represent specific driving behavior for a defined time period. Thus, the model may be executed in different driving situations.

Since it is rather unrealistic that all faults exist during the whole scenarios, faults are inserted into the model at several random points in time. Each simulation run is characterized by the scenario, by the fault type (including the no-fault scenario), by the faulty component—e.g., the actuator for the throttle—and by the point in time the failure occurs.

Then several scenarios were simulated using the different fault types of the accelerator pedal position sensor. For every simulation run the values of all relevant signals, i.e., signals that may have been influenced by the faulty accelerator pedal sensor, were logged and written to a simulation database, C. As an alternative, all accessible data could be logged. Additionally, the information about the fault type is stored at the database C. For simulations of faults, the fault type and the time when the fault occurred were also stored in the database C.

Figure 7:
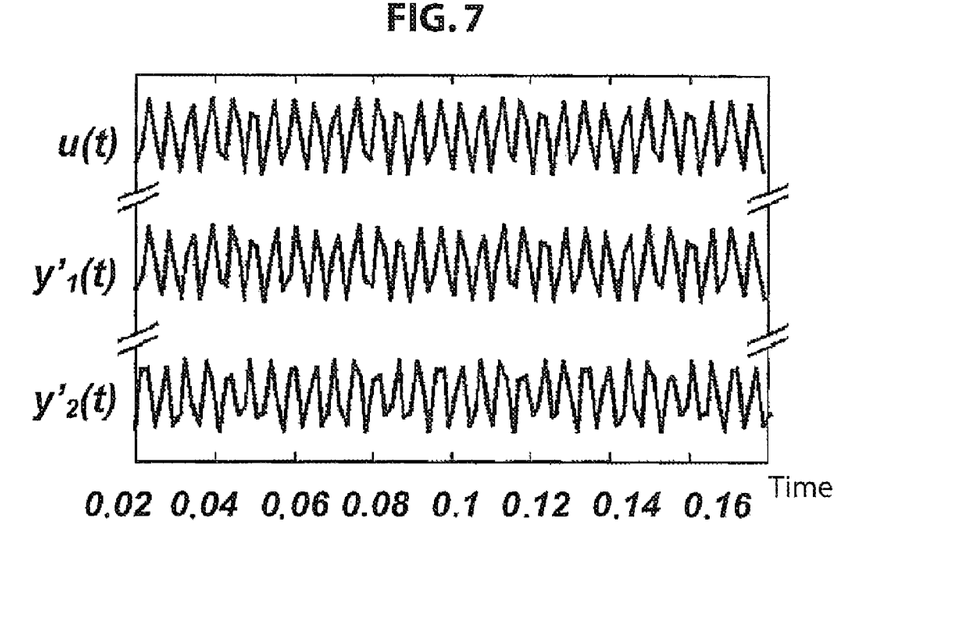
FIG. 7 illustrates results of a simulation of a faultless behavior model according to a model of the present invention.
Figure 8:
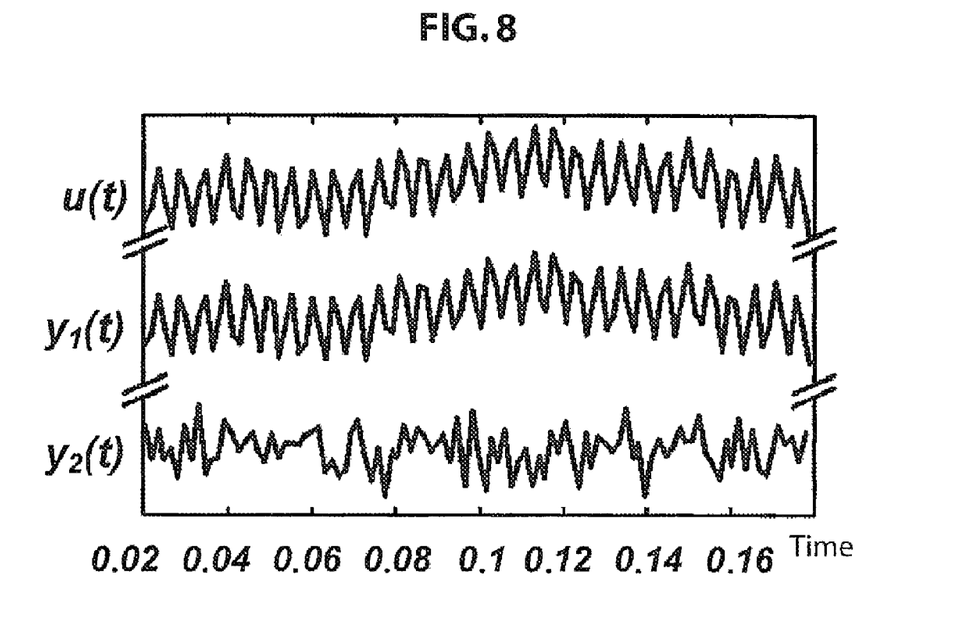
FIG. 8 illustrates results of a simulation of a fault behavior model corresponding to the faultless behavior model illustrated in FIG. 7.

In FIGS. 7 and 8, an extract of the simulation results of a faultless and of a faulty behavior, respectively, are shown. FIG. 7 illustrates the results of the simulation of a faultless behavior model. $u_1(t)$, $y_1(t)$, and $y_2(t)$ designate the accelerator pedal position, the throttle position, and the number of revolutions, respectively. FIG. 8 illustrates the results of the simulation of a fault behavior model that corresponds to the faultless behavior model in FIG. 7. The introduced and simulated fault puts noise on the pedal position signal. The comparison of both figures reveals that the fault of the accelerator pedal sensor influences other values such as the throttle position value and the number of revolutions.

Learning the Diagnosis Function

After simulating the system in different scenarios with different faults (again, including the no-fault case), a machine learning approach has been applied to the simulation results as presented in Equation 3. Generally, the algorithm shall use the data of the no-fault simulation and the data of one fault simulation run (e.g., the noisy signal) to detect patterns in the data. Based on this detection, the algorithm develops a classification function which decides whether the accelerator pedal sensor was noisy or not. Ideally, this classifier can also be applied to new measured data of a real vehicle, which means that the classifier has to generalize the data. Thus, it is a goal of the present invention to find a machine learning approach that will learn the classification function as best as possible.

In the field of machine learning, several algorithms exist. Two different learning algorithms are applied here:

Linear Regression. This common method uses a least square estimation to get parameters $a_1, \ldots, a_n \in R$ for the diagnosis function template $$d_i = a_1 \cdot v_1 + \ldots + a_n \cdot v_n \text{ with}$$

$$d_i = \begin{matrix} 0 & \text{if failure } i \text{ occurs} \\ 1 & \text{else} \end{matrix}$$

$v_1, \ldots, v_n$ are the variables measured during the simulation. For details, please refer to T. Wonnacot and R. Wonnacot, *Regression: A second course in statistics*, John Wiley & Sons, New York, Chichester/Brisbane/Toronto, 1981; R. H. Myers. Classical and Modern Regression with Applications. Duxbury Press, Boston, 1986; S. Weisberg. Applied Linear Regression. John Wiley & Sons, New York, 1985; K. Backhaus, B. Erichson, W. Plinke, and R. Weber. Multivariate Analysemethoden. Springer, 1996; and Hartung, J: Statistic. Oldenbourg, 1999, each of which is hereby incorporated by reference as if set forth in its entirety.

Decision Trees. A decision tree uses a series of binary decisions to reach a classification. Learning such a tree is done by binary recursive partitioning of the input space using a given optimization criterion. Details about decision trees can be found in L., Breiman, J. H. Friedman, R. A. Olshen, and C. J. Stone, *Classification and Regression Trees*, Wadsworth, 1984; and Ripley, B. D.: Pattern Recognition and Neural Networks. Cambridge University Press, 1996, each of which is hereby incorporated by reference as if set forth in its entirety.

For the case study of the present invention, the R programming environment has been used.

The problem with the above procedure is that a diagnosis function learned for a special fault type may not know how to deal with data measured in a situation where another fault type has occurred. To differentiate between the different fault types, in a second step, the data for learning a diagnosis function of a specific fault type was extended by the data of the other three corresponding fault types. This new data was classified as non-failure scenarios. The disadvantage of this procedure is that the number of failure cases is no longer equivalent to the number of non-failure cases, thus making an assessment of the learning result rather difficult.

Figure 9:
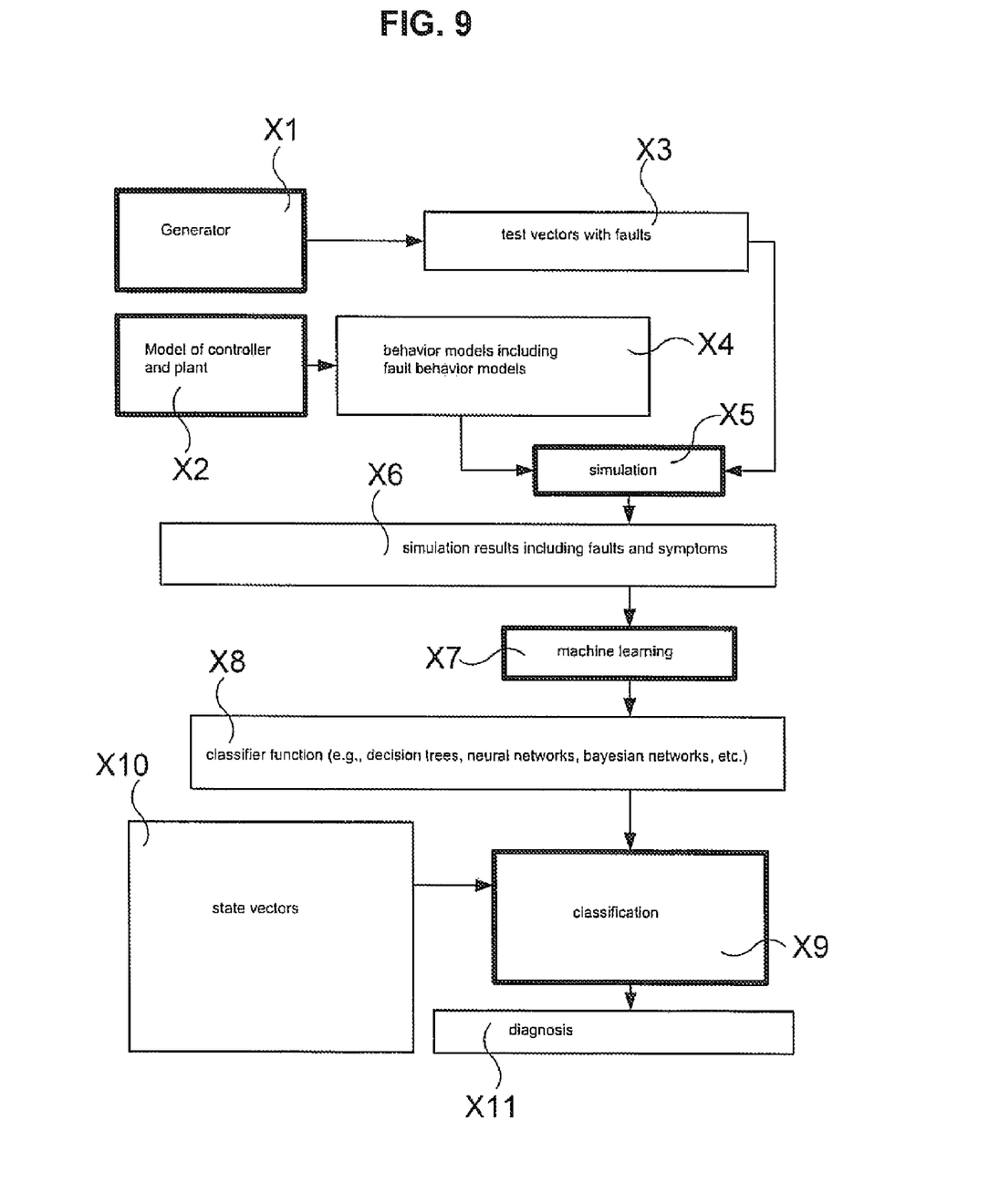
FIG. 9 illustrates a flowchart of an embodiment of the present invention.

FIG. 9 illustrates an exemplary flowchart according to the present invention. A generator X1 provides test vectors X3 for different test scenarios to a simulation X5. The text vectors X3 are provided with faults. In addition to test vectors X3, behavior models X4, which are executable, are provided to the simulation X5. The behavior models X4 include fault behavior models provided by a model of controller and plant X2. The simulation results X6, which include faults and symptoms, are stored during a simulation X5 run.

By applying methods of machine learning X7 to the simulation results X6, a classifier function X8 is learned. The classifier function X8 may be a decision tree, neural network, Bayesian network, etc. The classifier function X8 offers a classification X9 and in the course of this a mapping of the symptom of a fault onto the fault.

State vectors X10 may be provided in order to differentiate between faults in different states of the mechatronic system. Ideally, the state vectors X10 are in the same format as the test vectors X3. The resulting diagnosis X11 reflects the detected fault as well as the state of the mechatronic system during occurrence of the fault.

Experimental Results

Though only simple standard algorithms for learning the diagnosis function were used and furthermore no preprocessing steps were implemented, the results show that quite good solutions could be achieved. Tables 1 and 2 show the error rates of the learned diagnosis functions for the four fault types "−10% offset", "+10% offset", "noisy signal", and "dropped out signal". The results are presented for both applied learning algorithms. Five runs were done for each of the failure types respectively. The average of the five runs is presented in the tables.

The error rate is the percentage of cases diagnosed incorrectly by the algorithm. In the first line, the error rates are shown that were achieved by runs with the same data that was used to learn the diagnosis function. The error rates in the second line were achieved with input data the algorithm did not learn to use the diagnosis function.

TABLE 1

Error rates of the linear regression for the four fault types.

| −10% offset | +10% offset | noisy signal | dropped out signal |
|---|---|---|---|
| 15.04% | 16.13% | 3.84% | 0.04% |
| 14.85% | 16.53% | 3.55% | 0.11% |

TABLE 2

Error rates of the decision tree for the four fault types.

| −10% offset | +10% offset | noisy signal | dropped out signal |
|---|---|---|---|
| 0.88% | 0.32% | 0.33% | 0.10% |
| 1.13% | 0.46% | 0.31% | 0.17% |

The results show that the decision tree algorithm performs much better than the linear regression. Only when the signal is dropped out, the linear regression is able to perform a little better than the decision tree. Furthermore, in each table, there is nearly no difference between the results in the first line and the results in the second line.

If the diagnosis functions is also used to differentiate between different failures types, the result were not as good as before. But nevertheless the results still show that it is possible to achieve satisfying results.

The present invention introduces the model compilation paradigm for the diagnosis of complex technical systems. Model compilation is fairly involved and combines modern simulation technology with methods from data mining and learning theory. The models M of interesting systems are simulated with respect to expected inputs along with possible faults, and a compiled diagnosis model is distilled from the huge set of generated data. At heart, the compiled model is a classifier, which is not only able to detect the simulated faults, but which will also generalize with respect to unseen situations.

Model compilation becomes particularly attractive due to the fact that the original simulation models M from the application domain can be utilized. In fact, within the presented case study from the automotive domain, M comprises a vehicle's plant and controller models; it is hybrid and contains more than 100 states. The outlined diagnosis situations address realistic signal faults that occur between the environment and the vehicle electronics. Two learning approaches, linear regression and decision trees were applied, leading to an acceptable (85%) and an excellent (99%) fault detection rate.

In addition, the present invention can be applied to more complex and different fault scenarios, which also consider software faults within ECUs. The application of stronger data filtering techniques during the data mining step, such as vector quantization and cluster analysis can also assist in creating a more accurate model. Further, more refined methods to differentiate between a large number of faults are desirable. Note that the choice and the adaptation of the machine learning algorithms are a key for the success of the model compilation paradigm, and, association rules or Bayesian networks have the potential to outperform decision trees on large data sets.

While the invention has been particularly shown and described with reference to preferred embodiments thereof, it will be understood by those skilled in the art that various changes in form and details may be made therein without departing from the spirit and scope of the invention.

What is claimed is:

1. A method for constructing a diagnosis function for mapping a symptom of a fault in an electromechanical system onto the fault the method comprising the steps of:

simulating, by a microprocessor utilizing a first mathematical model, the electromechanical system in at least a fault-mode and a non-fault-mode; and     learning, by at least one of filtering, machine learning, data mining, and pattern recognition, a classifier function of a second mathematical model from collected simulation results so as to provide a diagnosis compiled model that is different from the first mathematical model and configured for mapping the symptom of the fault onto the fault.

2. The method according to claim 1, wherein the simulating step comprises simulating the electromechanical system for given vectors of input functions, and further comprising the step of determining symptom vectors by compiling the results of fault- and non-fault-simulations and comparing related results.

3. The method according to claim 1, further comprising the step of:

prior to the learning step, generalizing the symptom.

4. The method according to claim 1, wherein the electromechanical system is a mechatronic system, and the method further comprises the steps of:

detecting the symptom of the fault in the mechatronic system; and mapping the detected symptom onto the fault using the learned classifier function.

5. The method according to claim 1 wherein the fault causes the symptom.

6. The method according to claim 1, wherein the learning step is performed using linear regression.

7. The method according to claim 1, wherein the learning step is performed using decision trees.

8. The method according to claim 1, wherein the electromechanical system includes a vehicle.

9. The method according to claim 2, further comprising the step of:

generalizing the compiled symptom vectors prior to the learning step.

10. The method according to claim 4, wherein the detecting step comprises detecting the symptom by comparing an expected behavior with an observed behavior of the mechatronic system.

11. The method according to claim 9, wherein the generalizing step comprises abstracting the compiled symptom vectors into intervals.

12. The method according to claim 10, wherein the detecting step comprises using a sensor reading.

* * * * *